Oct. 9, 1928.
W. T. BURKE
1,686,678
FLEXIBLE CABLE ADJUSTER
Filed Aug. 11, 1923
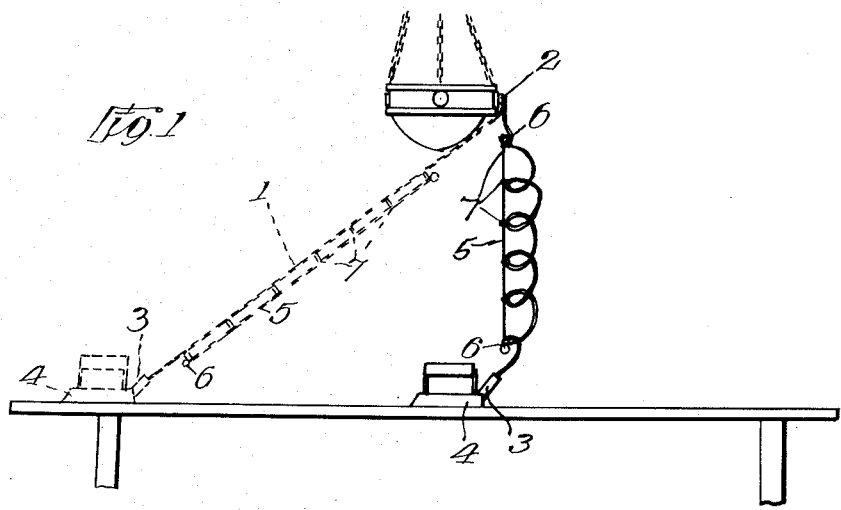
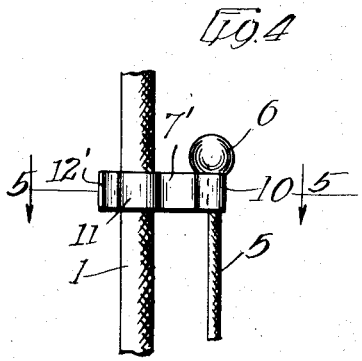
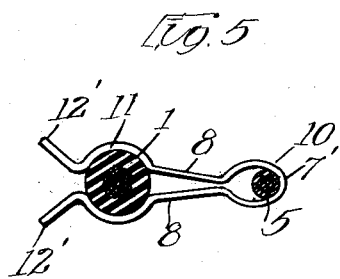
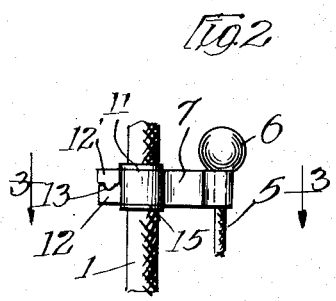
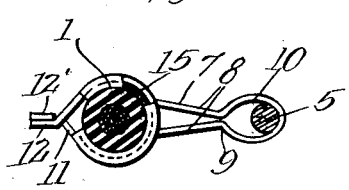
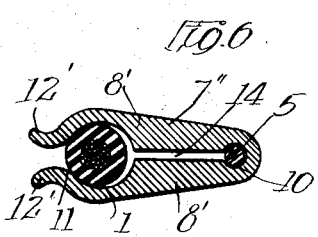
Witnesses:
Harry L. White
W. P. Kilroy
Inventor
Walter T. Burke.
By Hill & Hill Attys.

Patented Oct. 9, 1928.

1,686,678

UNITED STATES PATENT OFFICE.

WALTER T. BURKE, OF CHICAGO, ILLINOIS.

FLEXIBLE-CABLE ADJUSTER.

Application filed August 11, 1923. Serial No. 656,864.

My invention relates to an improvement in flexible cable adjusters, and is particularly intended for adjusting electric light or other cords so as to temporarily shorten them or take up their slack, but permit their elongation at will.

When using certain electric appliances, such as vacuum cleaners, electric irons, telephone cords or the like, the extension cord to the wall plug, or the fixture socket, is liable to become entangled in the electric appliance or other objects and cause injury to the extension cord, the appliance, or to both, and the principal object of my invention is to provide means adapted to be attached to the extension cord so as to normally loop the extension cord throughout the major portion of its length and automatically take up its slack but permit the elongation or full extension thereof when desired.

The invention has among its other objects the production of a device of the kind described which is simple, convenient, compact, economical, durable, reliable, satisfactory and efficient for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a view showing the manner of attachment of my device;

Fig. 2 is a fragmentary detail showing the connection between the elastic cable and the electric cord;

Fig. 3 is a section taken substantially on the line 3—3 of Fig. 2.

Fig. 4 is a view similar to that shown in Fig. 2, but with a modified form of clip;

Fig. 5 is a section taken substantially on line 5—5 of Fig. 4; and

Fig. 6 is a section illustrating another modified form of clip.

In the drawings, wherein I have illustrated the preferred embodiments of my invention, 1 indicates a flexible cable or cord, that shown being an extension cord for use with an electric appliance, as for instance an electric iron, one end of the cable being secured to a source of electric energy at 2 and being connected at its other end to the electric appliance 4 as at 3.

The length of cable is generally sufficient to permit the electric appliance to be moved a considerable distance without pulling the cable out of its socket, but when moving the appliance toward the fixture as on the return stroke of the iron, there is danger of its becoming entangled in the cable or causing an accidental short circuit.

In order to prevent this objectionable possibility, I have provided an elastic, flexible cable or cord 5 of a smaller length than that of the cable 1 when the elastic cord is in its contracted form, said elastic cord having enlargements 6 at the ends thereof for a purpose to be more clearly hereinafter described.

Clips 7 are arranged to be slidable on the elastic cable and to be frictionally engageable with the cable 1 at spaced points thereon intermediate the ends 6 of the elastic cable. Each of the clips in the form shown in Figs. 2 and 3 comprises a member made preferably of spring-metal, bent to form a pair of adjacent legs 8, brought closely adjacent one another at one end to form an eye 10, through which the cable 5 may be loosely and slidably threaded, said legs being spread apart toward their free ends to form an enlarged or bowed portion 11 therebetween of a size to frictionally engage the flexible cable 1, the free ends of said legs being indicated at 12.

In order to detachably lock or clamp the clip onto the cable 1, a lip or projection 13 is provided on one of the legs 12, the same being adapted to snap past the edge of the cooperating leg and lock the legs together in position against accidental release from the cable. If desired, a bushing or sleeve 15 of insulating material may be interposed between the clip and the cable.

The length of cable 1 that is held in place between the end clips 7 is substantially greater than the normal length of the elastic cable, as indicated in full lines in Fig. 1. Whenever the flexible cable 1 is pulled to its elongated position, as indicated in dotted lines in Fig. 1, the elastic cable will be put under tension, its enlarged ends abutting the extreme end clips to prevent movement therepast so that when the electric appliance is moved back to its full line position, the tension in the elastic cable will be sufficient to automatically contract the flexible cable 1 or to coil it to form loops therein, as shown. Thus it is seen that the elastic cable serves to take up any slack in the flexible cable between the fixed points where the clips are attached.

In the modification shown in Figs. 4 and 5, the locking means between the ends of the clip has been omitted and the spring action alone is relied upon to hold the clip in place upon the cable.

The clip 7' shown in this modification has the free ends 12' divergent so as to more easily permit the clip to be slipped onto the cable 1.

The modification shown in Fig. 6 operates in substantially the same manner as that indicated in Figs. 4 and 5, the same being formed of some resilient material, as hard rubber or the like, having a slit 14 formed therethrough to provide the resilient spaced legs 8'. This clip 7" has its free ends curved outwardly to diverge as at 12' in order to facilitate its frictionally receiving the cable 1.

Having thus described my invention, it is obvious that various immaterial modifications may be made in the same without departing from the spirit of my invention, hence I do not wish to be understood as limiting myself to the exact form, construction, arrangement and combination of parts herein shown and described, or uses mentioned.

What I claim as new and desire to secure by Letters Patent is:

1. In combination, an elastic cord, clips slidably carried therealong for frictional connection with an electric cord at spaced intervals, and enlargements at the ends of said elastic cord, each of said clips having a pair of legs forming an eye at their connected ends to freely, slidably receive the elastic cord and having the free ends shaped to frictionally grip the electric cord.

2. In combination, an elastic cord, clips slidably carried therealong for frictional connection with an electric cord at spaced intervals, enlargements at the ends of said elastic cord, each of said clips having a pair of legs forming an eye at their connected ends to slidably receive the elastic cord and having the free ends shaped to frictionally grip the electric cord, and means for interlocking the free ends of said clip about the electric cord.

3. The combination with an electric cord of a flexible elastic cable having enlargements at its ends and clips slidably mounted on the electric cord at spaced intervals, each of said clips having a pair of legs forming an eye at their connected ends to accommodate the flexible elastic cable and having their free ends adapted to frictionally grip the electric cord, the free ends of each clip being interlocked to prevent accidental displacement of the clip relative to the electric cord.

4. Means for taking up slack in an electric cord comprising a flexible elastic cable having enlargements at its ends and clips adapted to be slidably mounted on the electric cord at spaced intervals, each of said clips having a pair of legs forming an eye at their connected ends to accommodate the flexible elastic cable and having their free ends adapted to frictionally grip the electric cord, the free ends of each clip being interlocked to prevent accidental displacement of the clip relative to the electric cord, and a plurality of means for insulating the clips from the electric cord.

In testimony whereof, I have hereunto signed my name.

WALTER T. BURKE.